United States Patent Office 3,468,668
Patented Sept. 23, 1969

3,468,668
METHOD FOR ADJUSTING SILAGE
Tsunezo Ushioda, 448 Horinouchi, 2 Suginamiku, and Tatsuo Koyanagi, 39 Sakuradai, 1 Nerimaku, both of Tokyo, Japan
No Drawing. Filed Jan. 5, 1967, Ser. No. 607,389
Claims priority, application Japan, Jan. 25, 1966, 41/4,165
Int. Cl. A23k 1/22, 3/03
U.S. Cl. 99—8                          3 Claims

ABSTRACT OF THE DISCLOSURE

This invention relates to a method for improving the nutritive quality of silage by adding to raw silage material a small amount of 2-oxo-4-methyl-6-ureido-hexahydropyrimidine and, thereafter ensiling.

BACKGROUND

There has been hitherto prevailing a method in which urea is added as a substitute of protein to increase the nutritive value of silage. However, in this case, there is a tendency of silage rotting during its adjustment which reduces the yield of normal parts. Besides this drawback there is accompanied a danger of killing livestocks on account of the mistake of feeding method. Moreover loss of urea due to the decomposition cannot be neglected. Further there are accompanied other drawbacks that the quality of the fodder is degraded and the preference of livestocks becomes worse due to the tendency of pH of silage turning to the alkaline side by the ammonia produced by such a decomposition and also due to the formation of compounds undesirable for a fodder such as acetic acid or the like.

Accordingly, it is an object of the present invention to provide a method for adjusting a silage which employs a silage additive having no such drawbacks of urea. Such an object and other advantage can be attained by the method of the present invention which employs CDU as a silage additive. According to the method of the present invention, CDU which is a condensation product of urea and acetaldehyde or crotonaldehyde, having a general formula of

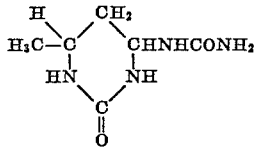

is added to the raw material for a silage in its preparation.

The amount of CDU to be added is usually 0.02-2% by weight of pasture grass having a mean water content of about 70% by weight (though there are various kinds of water content in pasture grasses). However it is also possible to add a greater amount of CDU. It is preferable that the method of application can be done uniformly throughout the pasture grass.

The pH of silage having been subjected to the method of the present invention does not show much difference from that of silage to which CDU is not added. The loss of nitrogen during the adjustment is not high. The increase of crude protein is considered to be due to the enhanced growth of microorganisms by the addition of CDU, and regarding the promotion for the growth of microorganisms, there is a disclosure in the specification of the pending U.S. application Ser. No. 603,165 entitled "Growth Promoting Method for Microorganisms."

It is noteworthy that the formation of acetic acid which is not preferable for a fodder is subdued and the formation of preferable lactic acid is promoted, whereby the quality of silage is exceedingly improved. Furthermore since the silage to which CDU is added gives out agreeable flavor, it can improve the preference of livestocks.

The silage of the present invention can be utilized for raising not only ruminants but also general herbivorous animals.

The present invention may be more fully understood from the following example which is offered by way of illustration and not by way of limitation. Percentages by weight are used throughout.

Example

The improvements of the quality of silage were compared between the case in which CDU is added and that in which urea is added.

(1) Condition of stuffing was as follows:

The materials used—orchard grass, ladino clover and hay.
Proportion of legumes—30%
Proportion of hay—30%
Water content—60%
Stuffing—materials are charged without cutting.

Treading pressure and weight stone for pressing down were set as usual. The amount of raw material grasses stuffed and that of CDU or urea added were as follows:

|  | Grass, kilogram | Percent of addition | Weight of addition, kilogram |
|---|---|---|---|
| Control: |  |  |  |
| Case in which anything was not added | 100 | | |
| Case in which CDU was added | 100 | 0.74 | 0.74(0.23 N) |
| Case in which urea was added | 100 | 0.50 | 0.50(0.23 N) |

Period of storage: 46 days during the time of autumn and winter.

(2) The yields at the time of taking out were as follows:

| | Distance of setting down, centimeter | Weight of rottenness part, kilogram | Weight of normal part, kilogram |
|---|---|---|---|
| Control: | | | |
| Case in which anything was not added | 5–5.5 | 27.8 | 63.1 |
| Case in which CDU was added | 3–3.5 | 21.2 | 67.0 |
| Case in which urea was added | 5–5.5 | 29.8 | 58.5 |

(3) The chemical compositions of silage were as follows:

| | pH | Water content, percent | Crude protein, percent | Acetic acid, percent | Butyric acid, percent | Lactic acid, percent |
|---|---|---|---|---|---|---|
| Control: | | | | | | |
| Case in which anything was not added | 4.9 | 61.1 | 5.21 | 2.44(56.8) | 0 | 1.85(43.2) |
| Case in which CDU was added | 5.0 | 60.7 | 6.94 | 1.18(31.2) | 0 | 2.60(68.8) |
| Case in which urea was added | 5.7 | 59.0 | 6.41 | 3.25(42.8) | 0 | 2.44(57.2) |

NOTE.—The figures in the parentheses are percentages relative to the total acid.

As indicated in the foregoing table, the silage preparation with the addition of CDU increases the yield of normal part, and reduces the weight of rottenness. It is desirous that the composition of adjusted silage does not tend to lie in the alkaline side of pH. The addition of CDU shows preferable value which is almost the same value as in the case where anything is not added. On the contrary, the addition of urea brings about a considerable increase of pH. Further, the silage with CDU shows higher amount of crude protein and higher value of lactic acid which is preferable as a fodder. On the other hand, the formation of acetic acid is little and that of butyric acid is none both of which are undesirable materials.

It is also a remarkable advantage that the nitrogen loss does not occur during the time of the preparation of silage in the case of CDU addition.

What is claimed is:
1. A method for adjusting silage to improve its nutritive quality which comprises adding to raw silage material 2-oxo-4-methyl-6-ureido-hexahydropyrimidine in an amount sufficient to increase the crude protein content, and thereafter ensiling.

2. The method according to claim 1 wherein the added material comprises about 0.02–2% by weight based on the silage.

3. The method according to claim 1 wherein said silage is selected from the group consisting of orchard grass, ladino and hay.

References Cited
UNITED STATES PATENTS
2,687,354   8/1954   Gribbins.

OTHER REFERENCES
Morrison: Feeds and Feeding, The Morrison Publishing Co., pp. 277–278, 1956, SF95, M68.

A. LOUIS MONACELL, Primary Examiner
NORMAN ROSKIN, Assistant Examiner